April 12, 1938. L. F. CHANEY ET AL 2,114,071
THERMOMETER AND THE LIKE
Filed May 25, 1936
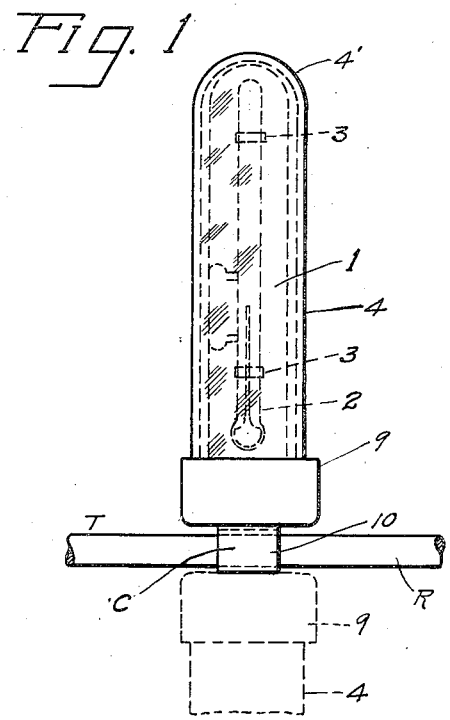
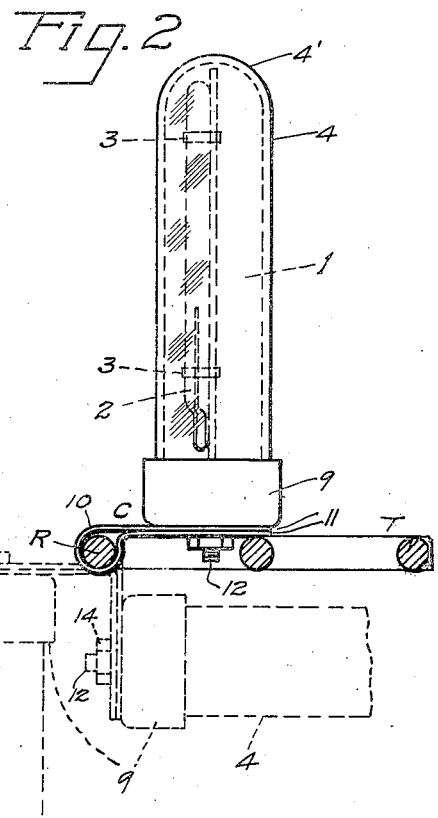
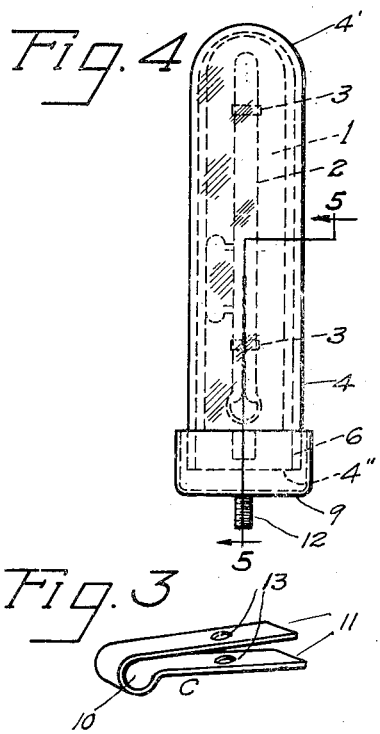
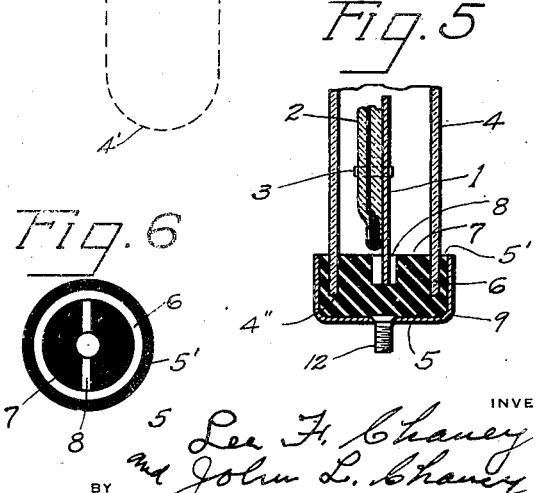
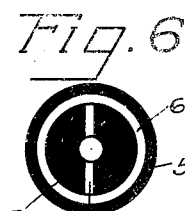
INVENTORS
Lee F. Chaney
and John L. Chaney
BY Staley & Welch
ATTORNEYS Patented Apr. 12, 1938

2,114,071

UNITED STATES PATENT OFFICE 2,114,071

THERMOMETER AND THE LIKE

Lee F. Chaney and John L. Chaney, Springfield, Ohio

Application May 25, 1936, Serial No. 81,566

4 Claims. (Cl. 73—378)

This invention relates to improvements in thermometers particularly adapted for refrigerators, although some of the constructions are equally applicable to steam or water gauges; the improvements relate so far as thermometers are concerned to means for mounting the thermometer and securing the mounting means to the glass enclosing tube. Another improvement relates to the means for enclosing an open end of the enclosing glass casing of a thermometer, this improvement, however, being equally applicable to sealing or closing an open end of other enclosures such as the closures of gauges.

One of the objects of the invention is the provision of means whereby the thermometer may be frictionally retained in a conveniently readable position, whether vertical or inclined as desired, and when it is desired, the thermometer may be swung out of the way for conveniently removing dishes or the like from the trays of the refrigerator.

Another object is to provide an improved method of firmly securing the mounting means and glass tube, which method has been developed as a least expensive method of manufacturing. Such thermometers are often made in extremely large quantities and often must be produced and assembled in a short time, and any such low-cost assembling method or construction which permits of the same is greatly beneficial to both purchaser and manufacturer.

Another object is to provide simple and effective means for closing an open end of an enclosure, such as a glass tube enclosure employed in thermometers or casings for gauges and the like.

In the accompanying drawing:

Fig. 1 is a front elevation of an improved refrigerator thermometer in place on a refrigerator tray.

Fig. 2 is a side elevation.

Fig. 3 is a perspective view of a detail.

Fig. 4 is a front elevation of the thermometer with the mounting means removed.

Fig. 5 is a fragmentary longitudinal section on the line 5—5 of Fig. 4.

Fig. 6 is a plan view of the resilient closure member.

Referring to the drawing, 1 represents the scale card to which is attached the tube 2 by the clips 3. At 4 is shown a glass enclosing member in the form of a closed end tube, the upper end 4' being closed while the lower end 4" is left open. The upper end of the scale card is rounded off to fit the inner rounded surface of the closed tube 4', and the scale card 1 with its attached tube 2 is inserted into the open end of the enclosure 4. To close the lower end, there is preferably employed a resilient member 5 moulded of rubber (Fig. 5).

This member is made of resilient material for the reasons that assembly is speeded up, since, as the glass enclosures vary slightly in internal and external diameters, there is no delay in sorting out these members to find one suitable for the enclosure in hand. The member is both a stopper and a protection for the lower end of the glass tube 4, as there is provided a comparatively deep annular groove 6 into which the glass tube is received. In forming the annular groove 6, the inner portion of the resilient member is left in the form of a cylindrical boss 7 which is made slightly larger than the average diameter of the tubes 4, so that when the member is assembled this slightly larger boss 7 is compressed when inserted into the bore of the tube 4, and the member and tube are firmly secured together in this manner.

To support the scale card there is preferably provided a crosswise groove in the boss 7, and the scale card is extended at its lower end below the thermometer tube 2 to be received in the crosswise groove 8.

The mounting means consists preferably of a drawn metal cap 9, or other cavity, of the nature of a cup. With the enclosing tube 4 and resilient stopper 5 assembled, the cap 9 is forced on the end of this assembly, and since as explained, an annular groove 6 is formed in the stopper 5, it means that the outer cylindrical portion 5' thereof encircles the enclosing tube 4, this encircling portion being of a skirt-like character.

The internal diameter of the metal cap and outer diameter of the skirt are of slightly different dimensions in the sense that the skirt is larger than the internal diameter of the cup, whereby when the cap is forced in place as shown in Fig. 5, the effect is that the material of the skirt is stretched between the cap and the glass tube 4 in a direction toward the open end of the cap.

It will be understood that if a portion of a resilient material such as rubber is stretched as this skirt is stretched, it undergoes a reduction in cross-sectional area which in this case amounts to a decrease in the wall thickness of the skirt, and the annular space between the exterior of the glass tube and the interior of the cap is designed to be only sufficiently large to cause the stretched condition described. The resilient material is always attempting to restore itself to its normal condition, or, in this case, to its normal wall thickness which results in an expansive and compressive effect on the interior of the cap and the exterior of the glass tube, respectively, to the end that the metal cap and glass tube are firmly secured together.

To frictionally attach the assembled thermometer to a refrigerator tray, there is provided a spring clip C of substantially U-form (Fig. 3). To the U-bend 10 are integrally attached the legs 11. It will be noticed that in its free state the legs are spread apart as seen in Fig. 3. Thus when this clip is placed on a rod R of a tray T, bringing the legs together as is done later, causes the clip to frictionally grip the rod R. To attach the assembled thermometer to the clip there is provided in the lower central portion of the cap 9, a short screw-threaded shank 12 secured as by soldering or otherwise to the cap 9, this shank being passed through aligned openings 13 adjacent the outer ends of the legs 11. A nut 14 is screwed on the shank and thereby brings the legs together.

The completed assembly is shown in Figs. 1 and 2 and by means of the frictional mounting, the thermometer may be placed in the full-line upright position where it will be retained by the frictional grip of the spring clip 10 on the rod R, or if desired, swung to the broken line positions or any intermediate position as found suitable.

Also, it will be clear that the resilient stopper retains the same air at all times within the interior of the enclosure 4 whereby dew is prevented from forming on the interior of the enclosure 4 and thus obscuring the view of the scale card, and that the entire assembly, including the cap, is firmly held together. Further, it will be evident from the description that the construction lends itself to the desired rapidity of assembly wanted in such large quantity operations.

Having thus described the invention it is claimed:

1. In a thermometer for attachment to a support in a refrigerator or the like, a transparent enclosure, a scale card therein, a thermometer tube attached to said card, and means for frictionally attaching said transparent enclosure to said support including a part encircling said support and devices to frictionally clamp said part to said support whereby the same may be moved from one position to another without disassembling said attaching means.

2. In a thermometer for attachment to a support in a refrigerator or the like, a transparent enclosure, a scale card mounted therein, a thermometer tube attached to said card, said enclosure being open at least at one end, means for closing said open end of said enclosure including a metallic cap, and means for frictionally attaching said cap to said support including a part encircling said support and devices to frictionally clamp said part to said support whereby the transparent enclosure may be moved from one position to another without disassembling said attaching means.

3. In a thermometer for attachment to a bar of a refrigerator or the like, a scale card and a thermometer tube attached thereto, a support for said card and tube, a spring clip having a U-bend to encircle said bar and a pair of legs extending from said bend, and means for attaching said legs to said support for the card and thermometer tube to cause the U-bend of said clip to frictionally engage said bar.

4. In a thermometer for attachment to a bar of a refrigerator or the like, a transparent enclosure open at least at one end, a scale card and a thermometer tube mounted in said enclosure, means for closing said open end of said enclosure including a metallic cap, a threaded projecting member carried by said cap, a clip having a U-bend to encircle said bar and a pair of apertured legs projecting therefrom, the apertures of said legs being adapted to receive said threaded projecting member, and a nut to clamp said legs on said threaded member and cause said U-bend to frictionally engage said supporting bar.

LEE F. CHANEY.
JOHN L. CHANEY.